United States Patent
Greer et al.

(10) Patent No.: US 8,147,973 B2
(45) Date of Patent: Apr. 3, 2012

(54) LAMINATED GLASS

(75) Inventors: Nathan Greer, Midland, MI (US);
Bizhong Zhu, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 13/000,769

(22) PCT Filed: Jul. 8, 2009

(86) PCT No.: PCT/US2009/049862
§ 371 (c)(1),
(2), (4) Date: Feb. 8, 2011

(87) PCT Pub. No.: WO2010/014362
PCT Pub. Date: Feb. 4, 2010

(65) Prior Publication Data
US 2011/0135940 A1 Jun. 9, 2011

Related U.S. Application Data

(60) Provisional application No. 61/085,037, filed on Jul. 31, 2008.

(51) Int. Cl.
*B32B 17/06* (2006.01)
*B32B 17/10* (2006.01)
*B32B 7/12* (2006.01)

(52) U.S. Cl. ............ 428/428; 428/429; 428/448

(58) Field of Classification Search .......... 428/428, 428/429, 448
See application file for complete search history.

(56) References Cited

U.S. PATENT DOCUMENTS

| | | | |
|---|---|---|---|
| 2,684,349 | A | 12/1952 | Whelton |
| 3,312,574 | A | 4/1967 | Laur et al. |
| 3,419,593 | A | 12/1968 | Willing |
| 3,615,272 | A | 10/1971 | Collin |
| 3,640,837 | A | 2/1972 | Gaeth et al. |
| 4,071,649 | A | 1/1978 | Jacquemin et al. |
| 4,087,585 | A | 5/1978 | Schulz et al. |
| 4,260,780 | A | 4/1981 | West |
| 4,264,681 | A | 4/1981 | Girard et al. |
| 4,276,424 | A | 6/1981 | Peterson et al. |
| 4,314,956 | A | 2/1982 | Baney et al. |
| 4,324,901 | A | 4/1982 | West et al. |

(Continued)

FOREIGN PATENT DOCUMENTS

DE 28 26 261 A1 1/1979

(Continued)

OTHER PUBLICATIONS

JP 04-190509, Published Jul. 8, 1992. Abstract only.

(Continued)

*Primary Examiner* — D. S. Nakarani
(74) *Attorney, Agent, or Firm* — Howard & Howard Attorneys PLLC

(57) ABSTRACT

A laminated glass comprising a first glass sheet; a first interlayer overlying the first glass sheet, wherein the first interlayer comprises a first polysilicate coating; a second glass sheet overlying the first interlayer; a second interlayer overlying the second glass sheet, wherein the second interlayer comprises a first reinforced silicone resin film having a first major surface and a second major surface, a first silicone adhesive coating lying directly on the first major surface of the film, and a second silicone adhesive coating lying directly on the second major surface of the film; and a third glass sheet overlying the second interlayer.

15 Claims, 2 Drawing Sheets

U.S. PATENT DOCUMENTS

| | | | |
|---|---|---|---|
| 4,444,825 A | 4/1984 | Vanderstukken et al. |
| 4,510,094 A | 4/1985 | Drahnak et al. |
| 4,530,879 A | 7/1985 | Drahnak et al. |
| 4,568,566 A | 2/1986 | Tolentino et al. |
| 4,766,176 A | 8/1988 | Lee et al. |
| 4,841,006 A | 6/1989 | Kobayashi et al. |
| 4,999,397 A | 3/1991 | Weiss et al. |
| 5,010,159 A | 4/1991 | Bank et al. |
| 5,017,654 A | 5/1991 | Togashi et al. |
| 5,063,267 A | 11/1991 | Hanneman et al. |
| 5,112,779 A | 5/1992 | Burns et al. |
| 5,194,649 A | 3/1993 | Okawa et al. |
| 5,283,309 A | 2/1994 | Morita |
| 5,310,843 A | 5/1994 | Morita |
| 5,340,898 A | 8/1994 | Cavezzan et al. |
| 5,358,983 A | 10/1994 | Morita |
| 5,397,645 A | 3/1995 | Varma et al. |
| 5,468,287 A | 11/1995 | Hattori et al. |
| 5,468,826 A | 11/1995 | Gentle et al. |
| 5,486,588 A | 1/1996 | Morita |
| 5,496,961 A | 3/1996 | Dauth et al. |
| 5,530,075 A | 6/1996 | Morita et al. |
| 5,565,273 A | 10/1996 | Egli et al. |
| 5,716,424 A | 2/1998 | Mennig et al. |
| 5,738,976 A | 4/1998 | Okinoshima et al. |
| 5,824,761 A | 10/1998 | Bujanowski et al. |
| 5,861,467 A | 1/1999 | Bujanowski et al. |
| 5,880,194 A | 3/1999 | Alvarez et al. |
| 5,959,038 A | 9/1999 | Furukawa et al. |
| 6,159,606 A | 12/2000 | Gelderie et al. |
| 6,509,423 B1 | 1/2003 | Zhu |
| 6,623,864 B1 | 9/2003 | Sweet et al. |
| 6,831,145 B2 | 12/2004 | Kleyer et al. |
| 7,687,587 B2 | 3/2010 | Smith et al. |
| 2003/0235383 A1 | 12/2003 | Gardner et al. |
| 2004/0071960 A1 | 4/2004 | Weber et al. |
| 2004/0214015 A1 | 10/2004 | Asai et al. |
| 2005/0042463 A1 | 2/2005 | Anderson et al. |
| 2006/0155039 A1 | 7/2006 | Alexander et al. |
| 2006/0204765 A1 | 9/2006 | Scheim et al. |
| 2007/0111014 A1 | 5/2007 | Katsoulis et al. |
| 2007/0122631 A1 | 5/2007 | Higuchi et al. |
| 2007/0178292 A1 | 8/2007 | Hasegawa et al. |
| 2007/0218262 A1 | 9/2007 | Degand et al. |
| 2007/0267215 A1 | 11/2007 | Dernovsek et al. |
| 2008/0051548 A1 | 2/2008 | Bailey et al. |
| 2008/0138525 A1 | 6/2008 | Bailey et al. |
| 2009/0105362 A1 | 4/2009 | Anderson et al. |
| 2009/0155577 A1 | 6/2009 | Anderson et al. |
| 2010/0188766 A1 | 7/2010 | Harimoto et al. |

FOREIGN PATENT DOCUMENTS

| | | |
|---|---|---|
| GB | 1290699 | 9/1972 |
| WO | WO 2005/115746 A1 | 12/2005 |
| WO | WO 2008/084083 A1 | 7/2008 |

OTHER PUBLICATIONS

JP 06-086017, Published Mar. 25, 1994. Abstract only.
JP 07-206482, Published Aug. 8, 1995. Abstract only.
JP 08-067538, Published Dec. 3, 1996. Abstract only.
JP 09-020867, Published Jan. 21, 1997. Abstract only.
JP 59-178749, Published Oct. 11, 1984. Abstract only.
JP 63-107122, Published May 12, 1988. Abstract only.
JP 2002-293585, Published Oct. 9, 2002. Abstract only.
JP 2003-246928, Published Sep. 5, 2003. Abstract only.
Weber, Andreas, et. al. "Thin Glass-Polymer Systems as Flexible Substrates for Displays," Schott Displayglas, Mainz, Germany, 2002.
Guo, Andrew, et. al., "Highly Active Visible-Light Photocatalysts for Curing a Ceramic Precursor," Chemistry of Materials, 1998, pp. 531-536, vol. 10, American Chem. Soc.
Reese, Herschel, "Development of Silicone Substrates to be Used with CIGS Deposition," United States Airforce, Office of Sponsored Research, 2005.

LAMINATED GLASS

CROSS REFERENCE TO RELATED APPLICATIONS

This application is a U.S. national stage filing under 35 U.S.C. §371 of PCT Application No. PCT/US09/49862 filed on 8 Jul. 2009, currently pending, which claims the benefit of U.S. Provisional Patent Application No. 61/085,037 filed 31 Jul. 2008 under 35 U.S.C. §119(e). PCT Application No. PCT/US09/49862 and U.S. Provisional Patent Application No. 61/085037 are hereby incorporated by reference.

FIELD OF THE INVENTION

The present invention relates to a laminated glass and more particularly to a laminated glass comprising a first glass sheet; a first interlayer overlying the first glass sheet, wherein the first interlayer comprises a first polysilicate coating; a second glass sheet overlying the first interlayer; a second interlayer overlying the second glass sheet, wherein the second interlayer comprises a first reinforced silicone resin film having a first major surface and a second major surface, a first silicone adhesive coating lying directly on the first major surface of the film, and a second silicone adhesive coating lying directly on the second major surface of the film; and a third glass sheet overlying the second interlayer.

BACKGROUND OF THE INVENTION

Laminated glass is used in a variety of industrial and consumer applications where high transparency, protection, and safety are of primary importance. For example, laminated glass is widely used in the automotive, electronic, appliance, construction, and aerospace industries.

Laminated glass typically consists of two or more sheets of glass and an adhesive interlayer between adjacent sheets. The interlayer material is commonly a thermoplastic or thermosetting adhesive. Furthermore, the adhesive may be an organic adhesive such as polyvinylbutyral or an inorganic adhesive such as an alkali metal silicate. Compared with laminated glass comprising an organic polymer interlayer, laminated glass comprising an alkali metal silicate interlayer offers the advantages of low flammability and high char yield. Such laminates are disclosed in U.S. Pat. No. 3,640,837 to Gaeth et al.; U.S. Pat. No. 5,565,273 to Egli et al.; U.S. Pat. No. 6,159,606 to Gelderie et al.; Great Britain Patent No. 1,290,699; Japanese Patent Application Publication No. 8067538 A to Motoharu et al.; and Japanese Patent Application Publication No. 7206482 A to Yoshimi et al.

Although laminated glass comprising an alkali metal silicate interlayer has low flammability and high char yield, it typically has low impact resistance compared with laminated glass having an organic polymer interlayer. Consequently, there is a need for a laminated glass having low flammability, high char yield, and high impact resistance.

SUMMARY OF THE INVENTION

The present invention is directed to a laminated glass, comprising:
a first glass sheet;
a first interlayer overlying the first glass sheet, wherein the first interlayer comprises a first polysilicate coating;
a second glass sheet overlying the first interlayer;
a second interlayer overlying the second glass sheet, wherein the second interlayer comprises a first reinforced silicone resin film having a first major surface and a second major surface, a first silicone adhesive coating lying directly on the first major surface of the film, and a second silicone adhesive coating lying directly on the second major surface of the film; and
a third glass sheet overlying the second interlayer; wherein the first polysilicate coating comprises from 50 to 85% (w/w) of at least one alkali metal polysilicate and from 15 to 50% (w/w) of water, wherein the alkali metal polysilicate has a mole ratio of silica to metal oxide of at least 1.05, and the first silicone adhesive coating and the second silicone adhesive coating each comprise a cured product of at least one silicone resin.

The present invention is also directed to a laminated glass, comprising:
a first glass sheet;
a first interlayer overlying the first glass sheet, wherein the first interlayer comprises a first reinforced silicone resin film having a first major surface and a second major surface, a first polysilicate coating overlying the first major surface of the film, and a second polysilicate coating overlying the second major surface of the film;
a second glass sheet overlying the first interlayer;
a second interlayer overlying the second glass sheet, wherein the second interlayer comprises a second reinforced silicone resin film having a first major surface and a second major surface, a first silicone adhesive coating lying directly on the first major surface of the film, and a second silicone adhesive coating lying directly on the second major surface of the film; and
a third glass sheet overlying the second interlayer; wherein the first polysilicate coating and the second polysilicate coating each comprise from 50 to 85% (w/w) of at least one alkali metal polysilicate and from 15 to 50% (w/w) of water, wherein the alkali metal polysilicate has a mole ratio of silica to metal oxide of at least 1.05, and the first silicone adhesive coating and the second silicone adhesive coating each comprise a cured product of at least one silicone resin.

The laminated glass of the present invention has high transparency, high adhesion during and after exposure to temperatures above the decomposition temperature of the adhesive, high heat resistance, low flammability (as evidenced by low heat release rate), and high char yield. Moreover, the laminated glass exhibits high impact resistance compared with a glass laminate having only a polysilicate interlayer.

The laminated glass of the present invention is useful in numerous applications, including fire protection, impact resistance, heat insulation, sound attenuation, solar control, safety, and security. For example, the laminated glass is useful as windshields, windows, and firewalls.

These and other features, aspects, and advantages of the present invention will become better understood with reference to the following description, appended claims, and accompanying drawings.

DETAILED DESCRIPTION OF THE INVENTION

As used herein, the term "overlying" used in reference to the position of an interlayer or glass sheet relative to a designated component means the interlayer or glass sheet either lies directly on the component or is separated from the component by one or more intermediary layer(s).

Figure 1:
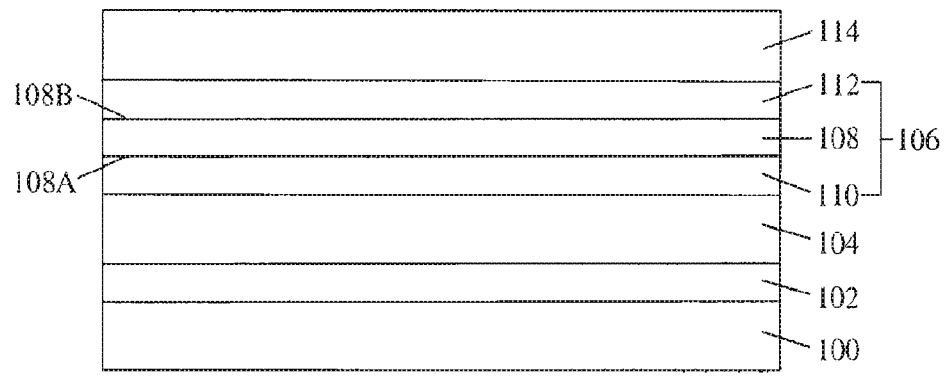
FIG. 1 shows a cross-sectional view of a first embodiment of a laminated glass according to the present invention.

As shown in FIG. 1, a first embodiment of a laminated glass according to the present invention comprises a first glass sheet 100; a first interlayer 102 overlying the first glass sheet 100, wherein the first interlayer 102 comprises a first polysilicate coating; a second glass sheet 104 overlying the first interlayer 102; a second interlayer 106 overlying the second glass sheet 104, wherein the second interlayer 106 comprises a first reinforced silicone resin film 108 having a first major surface 108A and a second major surface 108B, a first silicone adhesive coating 110 lying directly on the first major surface 108A of the film 108, and a second silicone adhesive coating 112 lying directly on the second major surface 108B of the film 108; and a third glass sheet 114 overlying the second interlayer 106; wherein the first polysilicate coating comprises from 50 to 85% (w/w) of at least one alkali metal polysilicate and from 15 to 50% (w/w) of water, wherein the alkali metal polysilicate has a mole ratio of silica to metal oxide of at least 1.05, and the first silicone adhesive coating 110 and the second silicone adhesive coating 112 each comprise a cured product of at least one silicone resin.

The laminated glass comprises at least a first glass sheet, a second glass sheet, and a third glass sheet. The glass sheets can have any thickness. For example, the glass sheets can be thin and flexible glass sheets having a thickness of 5 to 1500 µm or thick and rigid glass sheets having a thickness of from 0.05 to 0.5 in. The glass sheets in the laminated glass may be identical or different. For example, the glass sheets may differ in thickness and/or composition.

The glass sheets can comprise any type of glass. Examples of suitable glasses include, but are not limited to, soda-lime glass, borosilicate glass, lead-alkali glass, borate glass, silica glass, alumino-silicate glass, lead-borate glass, sodium borosilicate glass, lithium aluminosilicate glass, Chalcogenide glass, phosphate glass, and alkali-barium silicate glass.

The first embodiment of the laminated glass comprises a first interlayer overlying the first glass sheet. The first interlayer comprises a first polysilicate coating. The first polysilicate coating comprises from 50 to 85% (w/w), alternatively from 55 to 80% (w/w), alternatively from 60 to 70% (w/w), of at least one alkali metal polysilicate and from 15 to 50% (w/w) of water, wherein the alkali metal polysilicate has a mole ratio of silica to metal oxide of at lest 1.05.

The alkali metal polysilicate comprises alkali metal cations associated with the silicate anions. The alkali metal polysilicate can comprise cations of a single alkali metal or cations of two or more alkali metals, e.g., sodium and potassium. The alkali metal polysilicate can also comprise a minor amount, e.g., 1 part per million by weight to 5% (w/w), based on the total weight of the alkali metal polysilicate, of at least one non-alkali metal cation. Examples of non-alkali metal cations include, but are not limited to, cations of alkaline earth metals such as calcium; and metals of transition metals such as iron, cobalt, chromium, copper, and zinc.

Examples of alkali metal polysilicates include, but are not limited to, sodium polysilicate, potassium polysilicate, lithium polysilicate, rubidium polysilicate, and cesium polysilicate. The alkali metal polysilicate can be a single alkali metal polysilicate or a mixture comprising two or more different alkali metal polysilicates.

In one embodiment of the laminated glass, the alkali metal polysilicate is sodium polysilicate. In another embodiment, the alkali metal polysilicate is potassium polysilicate. In still another embodiment, the alkali metal polysilicate is a mixture of sodium polysilicate and potassium polysilicate.

The alkali metal polysilicate typically has a mole ratio of silica ($SiO_2$) to metal oxide ($M_2O$, wherein M is an alkali metal), of from 1.05 to 50, alternatively from 1.2 to 10, alternatively from 2 to 8. When the mole ratio of silica to metal oxide is less than 1.05, the first polysilicate coating may have inadequate moisture resistance. When the mole ratio is greater than 50, the first polysilicate coating may be too brittle.

The first polysilicate coating comprises from 15 to 50% (w/w), alternatively from 20 to 45% (w/w), alternatively from 30 to 40% (w/w), of water. When the water content of the coating is less than 15%, the coating may be susceptible to cracking. Also, when the water content is greater than 50%, the coating may have inadequate mechanical strength.

The first polysilicate coating can further comprise at least one metal phosphate. Examples of metal phosphates include, but are not limited to, aluminum phosphate, zinc phosphate, and zirconium phosphate. The concentration of the metal phosphate is typically from 0.01 to 30% (w/w), based on the total weight of the first polysilicate coating.

The first polysilicate coating can be a single layer coating or a multiple layer coating comprising two or more layers, where directly adjacent layers have a different composition (e.g., alkali metal, $SiO_2/M_2O$ mole ratio, water content). The multiple layer coating typically comprises from 2 to 100 layers, alternatively from 2 to 10 layers, alternatively from 2 to 5, layers.

The single layer polysilicate coating typically has a thickness of from 1 to 15,000 µm, alternatively from 50 to 5,000 µm, alternatively from 1,000 to 3,000 µm. The multiple layer coating typically has a thickness of from 1 to 15,000 µm, alternatively from 50 to 5,000 µm, alternatively 1,000 to 3,000 µm. When the thickness of the first polysilicate coating is less than 1 µm, the coating may become discontinuous. When the thickness of the coating is greater than 15,000 µm, the coating may exhibit reduced adhesion and/or cracking.

The first polysilicate coating typically has high transparency. The transparency of the coating depends on a number of factors, such as the composition and thickness of the coating. For example, a polysilicate coating having a thickness of 50 µm typically has a percent transmittance of at least 80%, alternatively at least 85%, for light in the visible region (~400 to ~700 nm) of the electromagnetic spectrum.

The first polysilicate coating can be formed as described below in the method preparing the laminated glass of the present invention.

The second glass sheet of the laminated glass overlies the first interlayer, where the second glass sheet is as described and exemplified above.

The second interlayer of the laminated glass comprises a first reinforced silicone resin film having a first major surface and a second major surface, a first silicone adhesive coating lying directly on the first major surface of the film, and a second silicone adhesive coating lying directly on the second major surface of the film. As used herein, the terms "first major surface" and "second major surface" refer to the two opposing surfaces of a reinforced silicone resin film that are parallel to the major dimension of the film.

The reinforced silicone resin film of the second interlayer typically comprises from 10 to 99% (w/w), alternatively from 30 to 95% (w/w), alternatively from 60 to 95% (w/w), alternatively from 80 to 95% (w/w), of a cured silicone resin. Also, the reinforced silicone resin film typically has a thickness of from 15 to 5000 μm, alternatively from 15 to 500 μm, alternatively from 20 to 300 μm, alternatively from 30 to 125 μm.

The reinforced silicone resin film can be any reinforced silicone resin film comprising a fiber reinforcement. Reinforced silicone resin films and methods of preparing the films from various curable silicone compositions are known in the art, as exemplified in the following International Patent Application Publications: WO2006/088645, WO2006088646, WO2007/092032, and WO2007/018756. Examples of fiber reinforcements include, but are not limited to reinforcements comprising glass fibers; quartz fibers; graphite fibers; nylon fibers; polyester fibers; aramid fibers, such as Kevlar® and Nomex®; polyethylene fibers; polypropylene fibers; and silicon carbide fibers.

The reinforced silicone resin film is typically prepared by impregnating a fiber reinforcement (e.g., woven or nonwoven glass fabric, or loose glass fibers) in a curable silicone composition comprising a silicone resin, and curing the silicone resin of the impregnated fiber reinforcement. Examples of curable silicone compositions include, but are not limited to, hydrosilylation-curable silicone compositions, condensation-curable silicone compositions, radiation-curable silicone compositions, and peroxide-curable silicone compositions. The silicone resin can be cured by exposing the composition to ambient temperature, elevated temperature, moisture, or radiation, depending on the type of curable silicone composition used to impregnate the fiber reinforcement.

The first silicone adhesive coating and the second silicone adhesive coating of the second interlayer each comprise a cured product of at least one silicone resin. As used herein, the term "cured product of a silicone resin" refers to a cross-linked silicone resin having a three-dimensional network structure. The silicone adhesive coating can be a single layer coating comprising one layer of a cured product of a silicone resin, or a multiple layer coating comprising two or more layers of at least two different cured products of silicone resins, where directly adjacent layers comprise different cured products (i.e., cured products have a different composition and/or property). The multiple layer coating typically comprises from 2 to 7 layers, alternatively from 2 to 5 layers, alternatively from 2 to 3 layers.

The single layer silicone adhesive coating typically has a thickness of from 0.03 to 300 μm, alternatively from 0.1 to 100 μm, alternatively from 0.1 to 50 μm. The multiple layer coating typically has a thickness of from 0.06 to 300 μm, alternatively from 0.2 to 100 μm, alternatively 0.2 to 50 μm. When the thickness of the silicone adhesive coating is less than 0.03 μm, the coating may become discontinuous. When the thickness of the silicone adhesive coating is greater than 300 μm, the coating may exhibit reduced adhesion and/or cracking.

The silicone resin, methods of preparing the resin, and methods of preparing the first silicone adhesive coating and the second silicone adhesive coating are described below in the method of preparing the laminated glass.

The third glass sheet of the laminated glass overlies the second interlayer, where the second glass sheet is as described and exemplified above.

Figure 2:
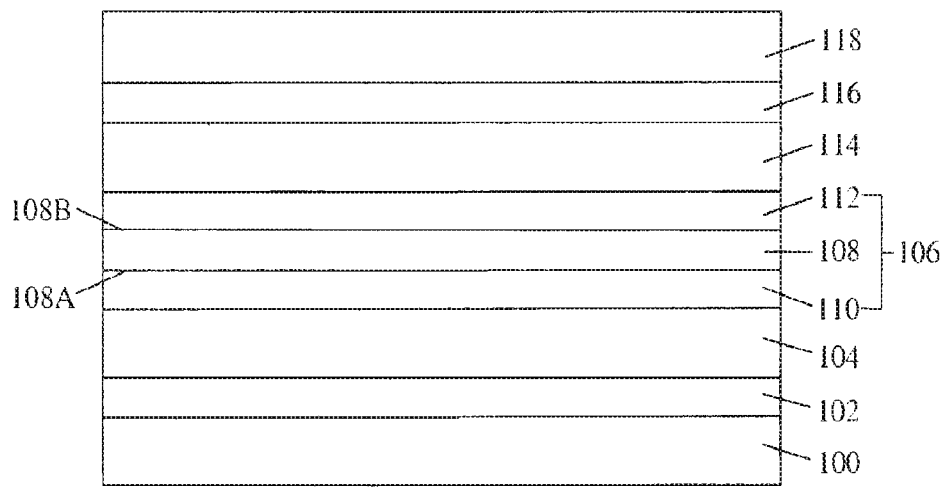
FIG. 2 shows a cross-sectional view of the previous embodiment of the laminated glass, further comprising a third interlayer overlying the third glass sheet, wherein the third interlayer comprises a second polysilicate coating; and a fourth glass sheet overlying the third interlayer.

As shown in FIG. 2, the first embodiment of the laminated glass can further comprise a third interlayer 116 overlying the third glass sheet 114, wherein the third interlayer 116 comprises a second polysilicate coating; and a fourth glass sheet 118 overlying the third interlayer 116, wherein the second polysilicate coating comprises from 50 to 85% (w/w) of at least one alkali metal polysilicate and from 15 to 50% (w/w) of water, wherein the alkali metal polysilicate has a mole ratio of silica to metal oxide of at least 1.05. The fourth glass sheet is as described and exemplified above for the laminated glass of the invention. Moreover, the second polysilicate coating is as described and exemplified above for the first polysilicate coating of the laminated glass.

The first embodiment of the laminated glass according to the present invention can be prepared using a variety of methods. For example the laminated glass of FIG. 1 can be prepared by forming a first interlayer between a first glass sheet and a second glass sheet, wherein the first interlayer comprises a first polysilicate coating; and forming a second interlayer between the second glass sheet and a third glass sheet, wherein the second interlayer comprises a first reinforced silicone resin film having a first major surface and a second major surface, a first silicone adhesive coating lying directly on the first major surface of the film, and a second silicone adhesive coating lying directly on the second major surface of the film; wherein the first polysilicate coating comprises from 50 to 85% (w/w) of at least one alkali metal polysilicate and from 15 to 50% (w/w) of water, wherein the alkali metal polysilicate has a mole ratio of silica to metal oxide of at least 1.05, and the first silicone adhesive coating and the second silicone adhesive coating each comprise a cured product of at least one silicone resin.

In the preceding method of preparing a laminated glass, a first interlayer is formed between a first glass sheet and a second glass sheet, wherein the first interlayer comprises a first polysilicate coating. The first polysilicate coating of the first interlayer can be formed using a variety of methods. For example, when the first polysilicate coating is a single layer coating, the coating can be formed by (i) applying an aqueous polysilicate composition on a surface of a first glass sheet to form a wet coating, wherein the composition comprises from 1 to 85% (w/w) of an alkali metal polysilicate and from 15 to 99% (w/w) of water, wherein the alkali metal polysilicate has a mole ratio of silica to metal oxide of at least 1.05; (ii) drying the wet coating to produce a first polysilicate coating comprising from 50 to 85% (w/w) of at least one alkali metal polysilicate and from 15 to 50% (w/w) of water, wherein the metal polysilicate has a mole ratio of silica to metal oxide of at least 1.05; (iii) placing a second glass substrate on the first polysilicate coating to form an assembly; and (iv) heating the assembly under pressure.

In step (i) of the method of forming the first polysilicate coating, an aqueous polysilicate composition is applied on a surface of a first glass sheet to form a wet coating, wherein the composition comprises from 1 to 85% (w/w) of an alkali metal polysilicate and from 15 to 99% (w/w) of water, wherein the alkali metal polysilicate has a mole ratio of silica to metal oxide of at least 1.05.

The alkali metal polysilicate of the aqueous polysilicate composition is as described and exemplified above for the first polysilicate coating of the laminated glass. Thus, the alkali metal polysilicate can be a single alkali metal polysilicate or a mixture comprising two or more different alkali metal polysilicates.

The concentration of the alkali metal polysilicate in the aqueous polysilicate composition is typically from 1 to 85% (w/w), alternatively from 40 to 70% (w/w), alternatively from 45 to 65% (w/w), based on the total weight of the composition.

The concentration of water in the aqueous polysilicate composition is typically from 15 to 99% (w/w), alternatively from 20 to 60% (w/w), alternatively from 35 to 55% (w/w), based on the total weight of the composition.

The pH of the aqueous polysilicate composition, which is a function of composition and concentration, is alkaline. For example, the polysilicate composition typically has a pH value of from 9 to 13.5, alternatively from 10 to 13, alternatively from 10 to 12, at room temperature (23±2° C.).

The aqueous polysilicate composition can comprise additional ingredients, provided the ingredient does not prevent the composition form drying to form the polysilicate coating of the adhesive tape, described above. For example the aqueous polysilicate composition can comprise a surfactant, for example, a nonionic surfactant, to facilitate application on the reinforced silicone resin film.

Methods of preparing aqueous polysilicate compositions comprising alkali metal polysilicates are well known in the art; many of these compositions are commercially available. For example, the following aqueous polysilicate solutions are sold by PQ Corporation: N® containing 8.9% (w/w) $Na_2O$ and 28.7% (w/w) $SiO_2$; N®Clear containing 8.9% (w/w) $Na_2O$ and 28.7% (w/w) $SiO_2$; N®38 containing 8.2% (w/w) $Na_2O$ and 26.4% (w/w) $SiO_2$; STIXSO®RR containing 9.2% (w/w) $Na_2O$ and 30.0% (w/w) $SiO_2$; E® containing 8.6% (w/w) $Na_2O$ and 27.7% (w/w) $SiO_2$; O® containing 9.1% (w/w) $Na_2O$ and 29.5% (w/w) $SiO_2$; KASIL®1 containing 8.3% (w/w) $K_2O$ and 20.8% (w/w) $SiO_2$; KASIL®6 containing 12.7% (w/w) $K_2O$ and 26.5% (w/w) $SiO_2$; KASIL® 1.8 containing 14.6% (w/w) $K_2O$ and 26.3% (w/w) $SiO_2$; KASIL®33 containing 11.6% (w/w) $K_2O$ and 24.4% (w/w) $SiO_2$; LITHISIL®25 containing 2.5% (w/w) $Li_2O$ and 20.5% $SiO_2$; and LITHISIL®829 containing 8.2% (w/w) $K_2O$, 1.0% (w/w) $Li_2O$, and 20.5% $SiO_2$.

The aqueous polysilicate composition can be applied on the surface of the first glass sheet using conventional methods such as dip coating, spray coating, flow coating, screen printing, gravure coating, slot die coating, knife over roll coating, and roll coating.

In step (ii) of the method of forming the first polysilicate coating, the wet coating is dried to produce a first polysilicate coating comprising from 50 to 85% (w/w) of at least one alkali metal polysilicate and from 15 to 50% (w/w) of water, wherein the metal polysilicate has a mole ratio of silica to metal oxide of at least 1.05. The wet coating is typically dried by removing water. This can be accomplished by exposing the wet coating to a temperature of from 15 to 90° C., alternatively from 15 to 45° C., alternatively from 20 to 30° C. for an amount of time sufficient to produce a polysilicate coating containing from 15 to 50% (w/w) of water. For example, the wet coating can be dried by heating the coating at a temperature of from 30 to 60° C. for a period of time of from 0.5 to 48 h.

Alternatively, the wet coating can be dried by exposing the wet coating to a relative humidity of from 0 to 90%, alternatively from 20 to 60%, alternatively from 30 to 55%, at room temperature. For example, the wet coating can typically be dried by exposing it to a relative humidity of from 50 to 60% in a sealed chamber for a period of from 12 to 48 h. The humidity can be controlled using conventional means, such as a commercially available humidity control chamber or a sealed chamber containing saturated aqueous calcium nitrate solution.

The method of forming the first interlayer, wherein the first polysilicate coating is a single layer coating can further comprise repeating the steps (i) and (ii) to increase the thickness of the coating, except the aqueous polysilicate composition is applied on the polysilicate coating rather than the first glass sheet, and the same polysilicate composition is used for each application.

A multiple layer polysilicate coating can be prepared in a manner similar to the method used to prepare a single layer coating, only adjacent layers of the coating are prepared using an aqueous polysilicate composition having a different composition and each film is dried before applying the aqueous polysilicate composition of the next layer.

In step (iii) of the method of forming the first polysilicate coating, a second glass sheet is applied on the dried polysilicate coating to form an assembly, where the second glass sheet is as described above for the laminated glass of the present invention.

In step (iv) of the method of forming the first polysilicate coating, the assembly is heated under pressure. The assembly is typically heated at a temperature of from room temperature 40 to 150° C., alternatively from 50 to 125° C., alternatively from 100 to 115° C. Moreover, the assembly is typically heated under a pressure of from $1\times10^3$ to $1\times10^7$ Pa, alternatively from $1\times10^4$ to $1\times10^6$ Pa, alternatively from $1\times10^4$ to $1\times10^5$ Pa. The heating time, which depends on temperature and pressure, is typically from 0.1 to 24 h, alternatively from 0.5 to 12 h, alternatively from 0.5 to 6 h. For example, an assembly heated at a temperature of from 50 to 60° C. and pressure of $1\times10^5$ Pa is typically heated for a period of from 2 to 4 h.

In the preceding method of forming a laminated glass, a second interlayer is formed between the second glass sheet and a third glass sheet, wherein the second interlayer comprises a first reinforced silicone resin film having a first major surface and a second major surface, a first silicone adhesive coating lying directly on the first major surface of the film, and a second silicone adhesive coating lying directly on the second major surface of the film; wherein the first polysilicate coating comprises from 50 to 85% (w/w) of at least one alkali metal polysilicate and from 15 to 50% (w/w) of water, wherein the alkali metal polysilicate has a mole ratio of silica to metal oxide of at least 1.05, and the first silicone adhesive coating and the second silicone adhesive coating each comprise a cured product of at least one silicone resin.

The second interlayer of the first embodiment of the laminated glass can be formed using a variety of methods. For example, the second interlayer can be formed by (i) applying a curable silicone composition comprising at least one silicone resin, described below, on the second glass sheet to form a first silicone adhesive film, (ii) placing a first major surface of a first reinforced silicone resin film, described above, on the first silicone adhesive film, (iii) applying a curable silicone composition comprising at least one silicone resin, described below, on a second major surface of the first reinforced silicone resin film to form a second silicone adhesive film, (iv) placing a third glass sheet on the second silicone adhesive film to form an assembly, and (v) curing the silicone resin of the first silicone adhesive film and the second silicone adhesive film.

In step (i) of the method of forming the second interlayer, a curable silicone composition comprising at least one silicone resin is applied on the second glass sheet to form a first silicone adhesive film. The curable silicone composition can be any curable silicone composition comprising at least one silicone resin. Curable silicone compositions and methods for their preparation are well known in the art. Examples of curable silicone compositions include, but are not limited to, hydrosilylation-curable silicone compositions, condensation-curable silicone compositions, radiation-curable silicone compositions, and peroxide-curable silicone compositions.

The silicone resin of the curable silicone composition can contain T siloxane units, T and Q siloxane units, or T and/or Q siloxane units in combination with M and/or D siloxane units. For example, the silicone resin can be a T resin, a TQ resin, an MT resin, a DT resin, an MDT resin, an MQ resin, a DQ resin, an MDQ resin, an MTQ resin, a DTQ resin, or an MDTQ resin.

The silicone resin typically contains silicon-bonded reactive groups capable of reacting in the presence or absence of a catalyst to form a cured product of the silicone resin. Examples of silicon-bonded reactive groups include, but are not limited to, —H, alkenyl, alkynyl, —OH, a hydrolysable group, alkenyl ether, acryloyloxyalkyl, substituted acryloyloxyalkyl, and an epoxy-substituted organic group.

The silicone resin typically has a weight-average molecular weight ($M_W$) of from 500 to 1,000,000, alternatively from 1,000 to 100,000, alternatively from 1,000 to 50,000, alternatively from 1,000 to 20,000, alternatively form 1,000 to 10,000, where the molecular weight is determined by gel permeation chromatography employing a refractive index detector and polystyrene standards.

A hydrosilylation-curable silicone composition typically comprises a silicone resin having an average of at least two silicon-bonded alkenyl groups or silicon-bonded hydrogen atoms per molecule; an organosilicon compound in an amount sufficient to cure the silicone resin, wherein the organosilicon compound has an average of at least two silicon-bonded hydrogen atoms or silicon-bonded alkenyl groups per molecule capable of reacting with the silicon-bonded alkenyl groups or silicon-bonded hydrogen atoms in the silicone resin; and a catalytic amount of a hydrosilylation catalyst.

A condensation-curable silicone composition typically comprises a silicone resin having an average of at least two silicon-bonded hydrogen atoms, hydroxy groups, or hydrolysable groups per molecule and, optionally, a cross-linking agent having silicon-bonded hydrolysable groups and/or a condensation catalyst.

A radiation-curable silicone composition typically comprises a silicone resin having an average of at least two silicon-bonded radiation-sensitive groups per molecule and, optionally, a cationic or free-radical photoinitiator depending on the nature of the radiation-sensitive groups in the silicone resin.

A peroxide-curable silicone composition typically comprises a silicone resin having silicon-bonded unsaturated aliphatic hydrocarbon groups and an organic peroxide.

The silicone composition can be applied on the first polysilicate coating and the second major surface of the reinforced silicone resin film using conventional methods such as dip coating, spray coating, flow coating, screen printing, and roll coating. When present, the solvent is typically allowed to evaporate from the silicone adhesive film. Any suitable means for evaporation may be used such as simple air drying, applying a vacuum, or heating (up to 50° C.).

In step (ii) of the method of forming the second interlayer, a first major surface of a first reinforced silicone resin film, described above, is placed on the first silicone adhesive film.

In step (iii) of the method of forming the second interlayer, a curable silicone composition comprising at least one silicone resin, described above, is applied on a second major surface of the first reinforced silicone resin film to form a second silicone adhesive film. The curable silicone composition can be applied on the second major surface of the first reinforced silicone resin film as described above in step (i) of the present method.

In step (iv) of the method of forming the second interlayer, a third glass sheet is placed on the second silicone adhesive film to form an assembly.

In step (v) of the method of forming the second interlayer, the silicone resin of the first silicone adhesive film and the second silicone adhesive film is cured. When at least one of the first silicone adhesive coating and the second silicone adhesive coating is a multiple layer silicone adhesive coating, typically each layer of the coating is at least partially cured before the next layer is formed.

The silicone resin of the first silicone adhesive film and the second silicone adhesive film can be cured by exposing the silicone adhesive film to ambient temperature, elevated temperature, moisture, or radiation, depending on the type of curable silicone composition used to form the film.

When the curable silicone composition is a hydrosilylation-curable silicone composition, the silicone resin can be cured by exposing the silicone adhesive film to a temperature of from room temperature (~23±2° C.) to 250° C., alternatively from room temperature to 150° C., alternatively from room temperature to 115° C., at atmospheric pressure. The silicone adhesive film is generally heated for a length of time sufficient to cure (cross-link) the silicone resin. For example, the film is typically heated at a temperature of from 100 to 150° C. for a time of from 0.1 to 3 h.

When the curable silicone composition is a condensation-curable silicone composition, the conditions for curing the silicone resin depend on the nature of the silicon-bonded groups in the resin. For example, when the silicone resin contains silicon-bonded hydroxy groups, the silicone resin can be cured (i.e., cross-linked) by heating the silicone adhesive film. The silicone resin can typically be cured by heating the silicone adhesive film at a temperature of from 50 to 250° C., for a period of from 1 to 50 h. When the condensation-curable silicone composition comprises a condensation catalyst, the silicone resin can typically be cured at a lower temperature, e.g., from room temperature (~23±2° C.) to 150° C.

When the curable silicone composition is a condensation-curable silicone composition comprising a silicone resin having silicon-bonded hydrogen atoms, the silicone resin can be cured by exposing the silicone adhesive film to moisture or oxygen at a temperature of from 100 to 450° C. for a period of from 0.1 to 20 h. When the condensation-curable silicone composition contains a condensation catalyst, the silicone resin can typically be cured at a lower temperature, e.g., from room temperature (~23±2° C.) to 400° C.

Further, when the curable silicone composition is a condensation-curable silicone composition comprising a silicone resin having silicon-bonded hydrolysable groups, the silicone resin can be cured by exposing the silicone adhesive film to moisture at a temperature of from room temperature (~23±2° C.) to 250° C., alternatively from 100 to 200° C., for a period of from 1 to 100 h. For example, the silicone resin can typically be cured by exposing the silicone adhesive film to a relative humidity of 30% at a temperature of from about room temperature (~23±2° C.) to 150° C., for a period of from 0.5 to 72 h. Cure can be accelerated by application of heat, exposure to high humidity, and/or addition of a condensation catalyst to the composition.

When the curable silicone composition is a radiation-curable silicone composition, the silicone resin can be cured by exposing the silicone adhesive film to an electron beam. Typically, the accelerating voltage is from about 0.1 to 100 keV, the vacuum is from about 10 to 10−3 Pa, the electron current is from about 0.0001 to 1 ampere, and the power varies from about 0.1 watt to 1 kilowatt. The dose is typically from about 100 microcoulomb/cm$^2$ to 100 coulomb/cm$^2$, alternatively from about 1 to 10 coulombs/cm$^2$. Depending on the voltage, the time of exposure is typically from about 10 seconds to 1 hour.

Also, when the radiation-curable silicone composition further comprises a cationic or free radical photoinitiator, the silicone resin can be cured by exposing the silicone adhesive film to radiation having a wavelength of from 150 to 800 nm, alternatively from 200 to 400 nm, at a dosage sufficient to cure (cross-link) the silicone resin. The light source is typically a medium pressure mercury-arc lamp. The dose of radiation is typically from 30 to 1,000 mJ/cm$^2$, alternatively from 50 to 500 mJ/cm$^2$. Moreover, the silicone adhesive film can be externally heated during or after exposure to radiation to enhance the rate and/or extent of cure.

When the curable silicone composition is a peroxide-curable silicone composition, the silicone resin can be cured by exposing the silicone adhesive film to a temperature of from room temperature (~23±2° C.) to 180° C., for a period of from 0.05 to 1 h.

The method of preparing the laminated glass depicted in FIG. 1 can further comprise compressing the assembly before or during the step of curing the silicone resin to remove excess silicone composition and/or entrapped air, and to reduce the thickness of the laminated glass. The assembly can be compressed using conventional equipment such as a stainless steel roller, hydraulic press, rubber roller, or laminating roll set. The assembly is typically compressed at a pressure of from 1,000 Pa to 10 MPa.

The laminated glass of FIG. 2 can be prepared as described above in the method of preparing the laminated glass of FIG. 1, with the following additional steps: forming a third interlayer between the third glass sheet and a fourth glass sheet, wherein the third interlayer comprises a second polysilicate coating. The second polysilicate coating can be formed as described above in the method of forming the first polysilicate coating of the first embodiment of the laminated glass.

Figure 3:
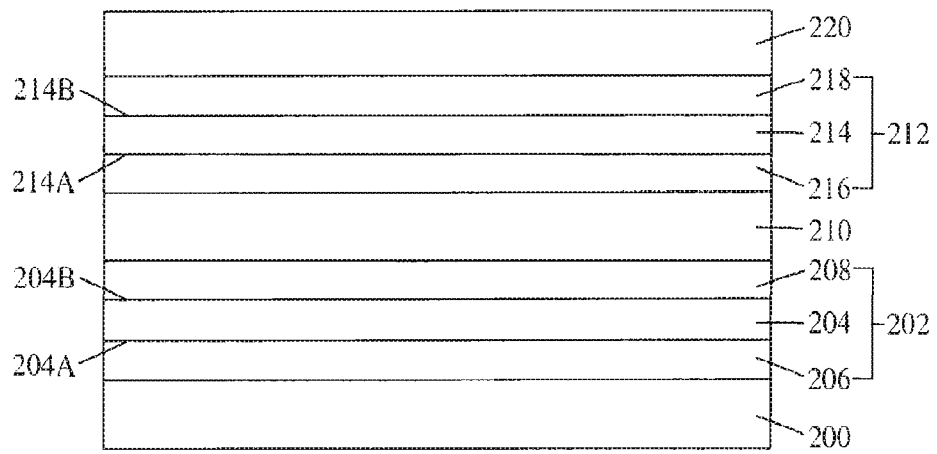
FIG. 3 shows a cross-sectional view of a second embodiment of a laminated glass according to the present invention.

As shown in FIG. 3, a second embodiment of a laminated glass according to the present invention comprises a first glass sheet 200; a first interlayer 202 overlying the first glass sheet 200, wherein the first interlayer 202 comprises a first reinforced silicone resin film 204 having a first major surface 204A and a second major surface 204B, a first polysilicate coating 206 overlying the first major surface 204A of the film 204, and a second polysilicate coating 208 overlying the second major surface 204B of the film 204; a second glass sheet 210 overlying the first interlayer 202; a second interlayer 212 overlying the second glass sheet 210, wherein the second interlayer 212 comprises a second reinforced silicone resin film 214 having a first major surface 214A and a second major surface 214B, a first silicone adhesive coating 216 lying directly on the first major surface 214A of the film 214, and a second silicone adhesive coating 218 lying directly on the second major surface 214B of the film 214; and a third glass sheet 220 overlying the second interlayer 212; wherein the first polysilicate coating 206 and the second polysilicate coating 208 each comprise from 50 to 85% (w/w) of at least one alkali metal polysilicate and from 15 to 50% (w/w) of water, wherein the alkali metal polysilicate has a mole ratio of silica to metal oxide of at least 1.05, and the first silicone adhesive coating 216 and the second silicone adhesive coating 218 each comprise a cured product of at least one silicone resin.

The glass sheets, polysilicate coatings, reinforced silicone resin films, and silicone adhesive coatings of the second embodiment of the laminated glass are as described and exemplified above for the first embodiment.

Figure 4:
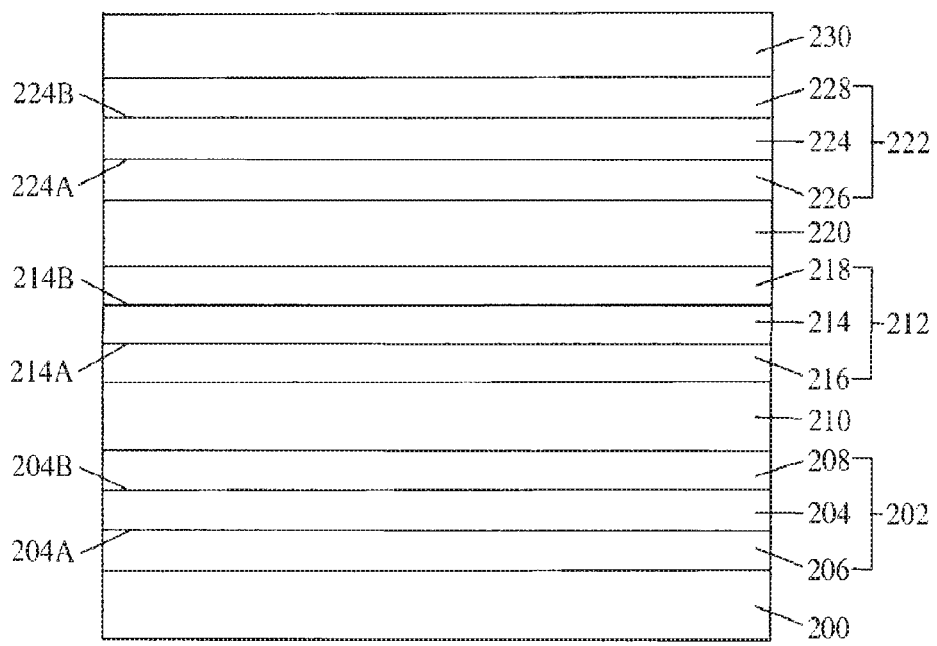
FIG. 4 shows a cross-sectional view of the previous embodiment of the laminated glass, further comprising a third interlayer overlying the third glass sheet, wherein the third interlayer comprises a third reinforced silicone resin film having a first major surface and a second major surface, a third polysilicate coating overlying the first major surface of the film, and a fourth polysilicate coating lying overlying the second major surface of the film; and a fourth glass sheet overlying the third interlayer

As shown in FIG. 4, the second embodiment of the laminated glass can further comprise a third interlayer 222 overlying the third glass sheet 220, wherein the third interlayer 222 comprises a third reinforced silicone resin film 224 having a first major surface 224A and a second major surface 224B, a third polysilicate coating 226 overlying the first major surface of the film 224A, and a fourth polysilicate coating 228 overlying the second major surface of the film 224B; and a fourth glass sheet 230 overlying the third interlayer 222; wherein the third polysilicate coating and the fourth polysilicate coating each comprise from 50 to 85% (w/w) of at least one alkali metal polysilicate and from 15 to 50% (w/w) of water, wherein the alkali metal polysilicate has a mole ratio of silica to metal oxide of at least 1.05.

The second embodiment of the laminated glass according to the present invention can be prepared using a variety of methods. For example the laminated glass of FIG. 3 can be prepared by forming a first interlayer between a first glass sheet and a second glass sheet, wherein the first interlayer comprises a first reinforced silicone resin film having a first major surface and a second major surface, a first polysilicate coating overlying the first major surface of the film, and a second polysilicate coating overlying the second major surface of the film; and forming a second interlayer between the second glass sheet and a third glass sheet, wherein the second interlayer comprises a second reinforced silicone resin film having a first major surface and a second major surface, a first silicone adhesive coating lying directly on the first major surface of the film, and a second silicone adhesive coating lying directly on the second major surface of the film; wherein the first polysilicate coating and the second polysilicate coating each comprise from 50 to 85% (w/w) of at least one alkali metal polysilicate and from 15 to 50% (w/w) of water, wherein the alkali metal polysilicate has a mole ratio of silica to metal oxide of at least 1.05, and the first silicone adhesive coating and the second silicone adhesive coating each comprise a cured product of at least one silicone resin.

In the preceding method of preparing a laminated glass, a first interlayer is formed between a first glass sheet and a second glass sheet, wherein the first interlayer comprises a first reinforced silicone resin film having a first major surface and a second major surface, a first polysilicate coating overlying the first major surface of the film, and a second polysilicate coating overlying the second major surface of the film. The first interlayer of the second embodiment of the laminated glass can be formed using a variety of methods. For example, the first interlayer can be formed by (i) applying an aqueous polysilicate composition, described above, on a surface of a first glass sheet to form a first wet coating, (ii) drying the first wet coating to produce a first polysilicate coating, (iii) placing a first major surface of a first reinforced silicone resin film, described above, on the first polysilicate coating, (iv) applying an aqueous polysilicate composition, described above, on a second major surface of the first reinforced silicone resin film to form a second wet coating, (v) drying the second wet coating to produce a second polysilicate coating, (vi) placing a third glass sheet on the second polysilicate coating to form an assembly, and (vii) heating the assembly under pressure, wherein the first polysilicate coating and the second polysilicate coating each comprise from 50 to 85%

(w/w) of at least one alkali metal polysilicate and from 15 to 50% (w/w) of water, wherein the metal polysilicate has a mole ratio of silica to metal oxide of at least 1.05

The second interlayer of the second embodiment of the laminated glass can be prepared as described above in the method of preparing the first interlayer of the first embodiment.

The third interlayer of the second embodiment of the laminated glass can be prepared as described above in the method of preparing the first interlayer of the second embodiment.

The laminated glass of FIG. 4 can be prepared as described above in the method of preparing the laminated glass of FIG. 3, with the following additional steps: forming a third interlayer between the third glass sheet and a fourth glass sheet, wherein the third interlayer comprises a third reinforced silicone resin film having a first major surface and a second major surface, a third polysilicate coating overlying the first major surface of the film, and a fourth polysilicate coating overlying the second major surface of the film; and a fourth glass sheet overlying the third interlayer. The third polysilicate coating and the fourth polysilicate coating can be formed as described in the method of forming the first polysilicate coating.

A third embodiment of a laminated glass according to the present invention is as described above for the first embodiment, except the second interlayer comprises a silicone adhesive coating and no reinforced silicone resin film, between the second glass sheet and the third glass sheet.

The laminated glass of the present invention has high transparency, high adhesion during and after exposure to temperatures above the decomposition temperature of the adhesive, high heat resistance, low flammability (as evidenced by low heat release rate), and high char yield. Moreover, the laminated glass exhibits high impact resistance compared with a glass laminate having only a polysilicate interlayer.

The laminated glass of the present invention is useful in numerous applications, including fire protection, impact resistance, heat insulation, sound attenuation, solar control, safety, and security. For example, the laminated glass is useful as windshields, windows, and firewalls.

EXAMPLES

The following examples are presented to better illustrate the laminated glass of the present invention, but are not to be considered as limiting the invention, which is delineated in the appended claims. Unless otherwise noted, all parts and percentages reported in the examples are by weight. The following materials were employed in the examples:

Silicone Composition A: a mixture containing 82% of a silicone resin having the formula $(PhSiO_{3/2})_{0.75}(ViMe_2SiO_{1/2})_{0.25}$, where the resin has a weight-average molecular weight of about 1700, a number-average molecular weight of about 1440, and contains about 1 mol % of silicon-bonded hydroxy groups; 18% of 1,4-bis(dimethylsilyl)benzene; and Platinum Catalyst, described below, in an amount sufficient to provide 10 ppm platinum, based on the total weight of the composition. The mole ratio of silicon-bonded hydrogen atoms in the 1,4-bis(dimethylsilyl)benzene to silicon-bonded vinyl groups in the silicone resin is 1.1:1, as determined by $^{29}SiNMR$ and $^{13}CNMR$.

Silicone Composition B: a mixture containing 72.4% of a silicone resin having the formula $(PhSiO_{3/2})_{0.75}(ViMe_2SiO_{1/2})_{0.25}$, where the resin has a weight-average molecular weight of about 1700, a number-average molecular weight of about 1440, and contains about 1 mol % of silicon-bonded hydroxy groups; 27.6% of 1,1,5,5-tetramethyl-3,3-diphenyltrisiloxane; and Platinum Catalyst, described below, in an amount sufficient to provide 10 ppm platinum, based on the total weight of the composition. The mole ratio of silicon-bonded hydrogen atoms in the 1,1,5,5-tetramethyl-3,3-diphenyltrisiloxane to silicon-bonded vinyl groups in the silicone resin is 1.1:1, as determined by $^{29}SiNMR$ and $^{13}CNMR$.

Silicone Composition C: a mixture containing 70.0% of a silicone resin having the formula $(ViMe_2SiO_{2/2})_{0.05}(SiO_{4/2})_{0.55}(Me_3SiO_{1/2})_{0.4}$, where the resin has a weight-average molecular weight of about 21,400; 30.0% of a dimethylvinyl-siloxy-terminated polydimethylsiloxane containing about 0.17% (w/w) of dimethylvinylsiloxy units; and 0.7 part by weight of dicumyl peroxide per 100 parts by weight of the silicone resin and polydimethylsiloxane combined.

Melinex® 516, sold by Dupont Teijin Films (Hopewell, Va.), is a polyethylene-terephthalate (PET) film pretreated on one side with a release agent for slip and having a thickness of 125 µm.

Glass Fabric is a heat-treated glass fabric prepared by heating style 106 electrical glass fabric having a plain weave and a thickness of 37.5 µm at 575° C. for 6 h. The untreated glass fabric was obtained from JPS Glass (Slater, S.C.).

Platinum Catalyst is a platinum catalyst containing 1000 ppm of platinum. The catalyst was prepared by treating a platinum(0) complex of 1,1,3,3-tetramethyldisiloxane in the presence of a large molar excess of 1,1,3,3-tetramethyldisiloxane, with triphenylphosphine to achieve a mole ratio of triphenylphosphine to platinum of about 4:1.

STIXSO®RR, sold by PQ Corporation (Valley Forge, Pa.), is an aqueous sodium silicate solution containing 9.2% $Na_2O$ and 30.0% $SiO_2$ (weight ratio $SiO_2:Na_2O=3.25$), and has a density of 1.41 g/cm$^3$ and a viscosity of 830 cps.

Example 1

The reinforced silicone resin films of Examples 5-7 were prepared according to the following procedure: Silicone Composition A was applied on the release agent-treated surface of a Melinex® 516 PET film (8 in.×11 in.) to form a silicone film. Glass Fabric having the same dimensions as the PET film was carefully laid down on the silicone film, allowing sufficient time for the composition to thoroughly wet the fabric. The aforementioned silicone composition was then uniformly applied to the embedded fabric. An identical PET film was placed on top of the coating with the release agent-treated side in contact with the silicone composition. The laminate was heated in an oven at 150° C. for 30 min. The oven was turned off and the laminate was allowed to cool to room temperature inside the oven. The upper PET film was separated (peeled away) from the reinforced silicone resin film, and the silicone resin film was then separated from the lower PET film. The transparent reinforced silicone resin film had a thickness of about 0.003-0.004 in.

Silicone Composition B was uniformly applied to both sides of the reinforced silicone resin film. The coated reinforced silicone resin film was placed between two PET film (8 in.×11 in.) with the release agent-treated sides of the PET films in contact with the silicone coatings. The assembly was passed between two stainless steel bars separated by a distance of 0.023 in. and then heated in an air circulating oven at 80° C. for 25 min.

Example 2

Flat float glass plates (6 in.×6 in.×⅛ in.) were washed with a warm solution of detergent in water, thoroughly rinsed with deionized water, and dried in air. An edge dam was constructed around the perimeter of each glass plates using masking tape. Approximately 45 mL of STIXSO®RR sodium silicate solution was applied on one side of each glass plate. The coated glass plates were kept in a sealed glass chamber containing saturated calcium nitrate solution and having a relative humidity of 51% for a period of 76 h. The polysilicate coating on each glass plate had a water content of from 32 to 35% (w/w).

Example 3

Silicone composition C was cast on a Melinex® 516 PET film and dried at a temperature of 120° C. in an air circulating oven for 10 min. to produce a silicone adhesive film having a thickness of about 0.006 in.

Example 4

Several glass composites, each containing two glass plates, were prepared using the polysilicate-coated glass plates of Example 2. The coated surfaces of two plates were brought into contact with one another. A 25-lb steel block was placed on the assembly, which were then heated in an oven at 115° C. for 4 h. The oven was turned off and the glass composites were allowed to cool to room temperature inside the oven.

Example 5

A first silicone adhesive film (Example 3) measuring 6 in.×6 in.×⅛ in. was placed on a first glass composite (Example 4). A reinforced silicone resin film (Example 1) having the same dimensions as the silicone adhesive film was placed on the adhesive film. A second silicone adhesive film (Example 3) was placed on the reinforced silicone resin film and a second glass composite (Example 4) was placed on the second silicone adhesive film. An 8-lb steel block was placed on the assembly, which was then heated in an oven at a rate of 5° C./min. to 115° C. The assembly was maintained at this temperature for 1 h. The oven was turned off and the laminated glass was allowed to cool to room temperature inside the oven.

Example 6

A laminated glass was prepared as described in Example 5, except the silicone adhesive film of Example 3 was replaced with a liquid silicone adhesive film prepared using silicone composition B.

Example 7

A laminated glass was prepared as described in Example 5, except the silicone adhesive film of Example 3 was replaced with a liquid silicone adhesive film prepared using silicone composition B, and the composite of Example 4 was replaced with the laminated glass of Example 6.

That which is claimed is:

1. A laminated glass, comprising:
   a first glass sheet;
   a first interlayer overlying the first glass sheet, wherein the first interlayer comprises a first polysilicate coating;
   a second glass sheet overlying the first interlayer;
   a second interlayer overlying the second glass sheet, wherein the second interlayer comprises a first reinforced silicone resin film having a first major surface and a second major surface, a first silicone adhesive coating lying directly on the first major surface of the film, and a second silicone adhesive coating lying directly on the second major surface of the film; and
   a third glass sheet overlying the second interlayer; wherein the first polysilicate coating comprises from 50 to 85% (w/w) of at least one alkali metal polysilicate and from 15 to 50% (w/w) of water, wherein the alkali metal polysilicate has a mole ratio of silica to metal oxide of at least 1.05, and the first silicone adhesive coating and the second silicone adhesive coating each comprise a cured product of at least one silicone resin.

2. The laminated glass according to claim 1, wherein the alkali metal polysilicate is sodium polysilicate.

3. The laminated glass according to claim 1, wherein the first polysilicate coating is a single layer coating.

4. The laminated glass according to claim 1, wherein the first polysilicate coating is a multiple layer coating.

5. The laminated glass according to claim 1, wherein at least one of the first silicone adhesive coating and the second silicone adhesive coating is a single layer coating.

6. The laminated glass according to claim 1, wherein at least one of the first silicone adhesive coating and the second silicone adhesive coating is a multiple layer coating.

7. The laminated glass according to claim 1, further comprising a third interlayer overlying the third glass sheet, wherein the third interlayer comprises a second polysilicate coating; and a fourth glass sheet overlying the third interlayer, wherein the second polysilicate coating comprises from 50 to 85% (w/w) of at least one alkali metal polysilicate and from 15 to 50% (w/w) of water, wherein the alkali metal polysilicate has a mole ratio of silica to metal oxide of at least 1.05.

8. A laminated glass, comprising:
   a first glass sheet;
   a first interlayer overlying the first glass sheet, wherein the first interlayer comprises a first reinforced silicone resin film having a first major surface and a second major surface, a first polysilicate coating overlying the first major surface of the film, and a second polysilicate coating overlying the second major surface of the film;
   a second glass sheet overlying the first interlayer;
   a second interlayer overlying the second glass sheet, wherein the second interlayer comprises a second reinforced silicone resin film having a first major surface and a second major surface, a first silicone adhesive coating lying directly on the first major surface of the film, and a second silicone adhesive coating lying directly on the second major surface of the film; and
   a third glass sheet overlying the second interlayer; wherein the first polysilicate coating and the second polysilicate coating each comprise from 50 to 85% (w/w) of at least one alkali metal polysilicate and from 15 to 50% (w/w) of water, wherein the alkali metal polysilicate has a mole ratio of silica to metal oxide of at least 1.05, and the first silicone adhesive coating and the second silicone adhesive coating each comprise a cured product of at least one silicone resin.

9. The laminated glass according to claim 8, wherein the alkali metal polysilicate is sodium polysilicate.

10. The laminated glass according to claim 8, wherein at least one of the first polysilicate coating and the second polysilicate coating is a single layer coating.

11. The laminated glass according to claim 8, wherein at least one of the first polysilicate coating and the second polysilicate coating is a multiple layer coating.

12. The laminated glass according to claim 8, wherein at least one of the first silicone adhesive coating and the second silicone adhesive coating is a single layer coating.

13. The laminated glass according to claim 8, wherein at least one of the first silicone adhesive coating and the second silicone adhesive coating is a multiple layer coating.

14. The laminated glass according to claim 8, further comprising a third interlayer overlying the third glass sheet, wherein the third interlayer comprises a third reinforced silicone resin film having a first major surface and a second major surface, a third polysilicate coating overlying the first major surface of the film, and a fourth polysilicate coating overlying the second major surface of the film; and a fourth glass sheet overlying the third interlayer; wherein the third polysilicate coating and the fourth polysilicate coating each comprise from 50 to 85% (w/w) of at least one alkali metal polysilicate and from 15 to 50% (w/w) of water, wherein the alkali metal polysilicate has a mole ratio of silica to metal oxide of at least 1.05.

15. A laminated glass, comprising:
a first glass sheet;
a first interlayer overlying the first glass sheet, wherein the first interlayer comprises a first polysilicate coating;
a second glass sheet overlying the first interlayer;
a second interlayer overlying the second glass sheet, wherein the second interlayer comprises a first silicone adhesive coating; and
a third glass sheet overlying the second interlayer; wherein the first polysilicate coating comprises from 50 to 85% (w/w) of at least one alkali metal polysilicate and from 15 to 50% (w/w) of water, wherein the alkali metal polysilicate has a mole ratio of silica to metal oxide of at least 1.05, and the first silicone adhesive coating comprises a cured product of at least one silicone resin.

* * * * *